R. AMBÜHL AND M. TEITSCH.
TIRE FILLER.
APPLICATION FILED AUG. 22, 1919. RENEWED MAR. 19, 1921.
1,389,806.
Patented Sept. 6, 1921.
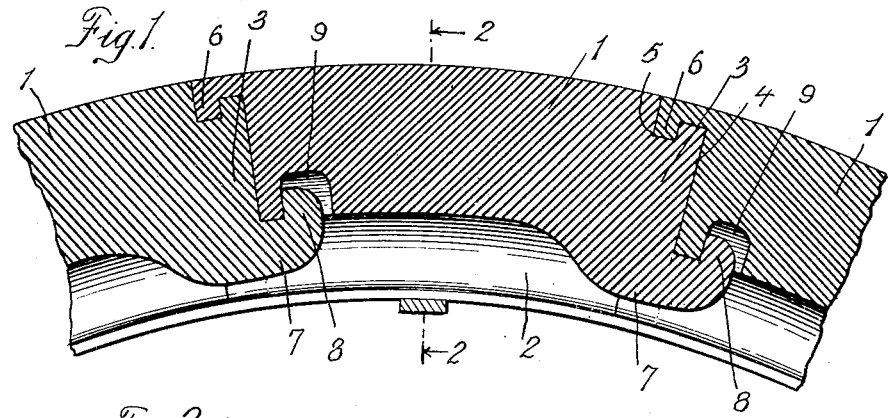
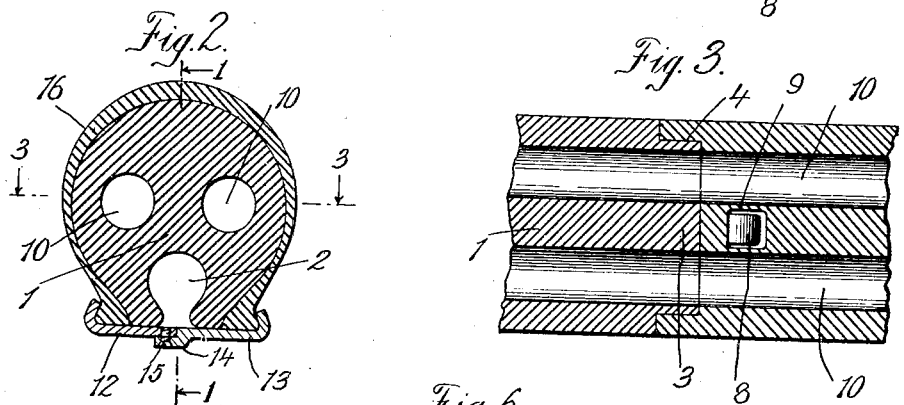
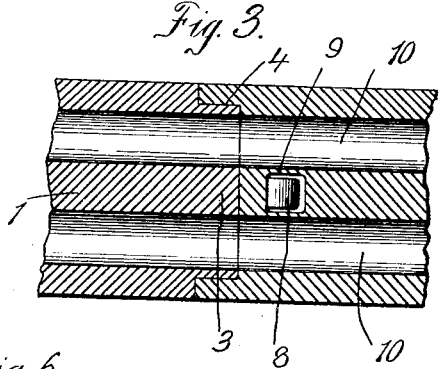
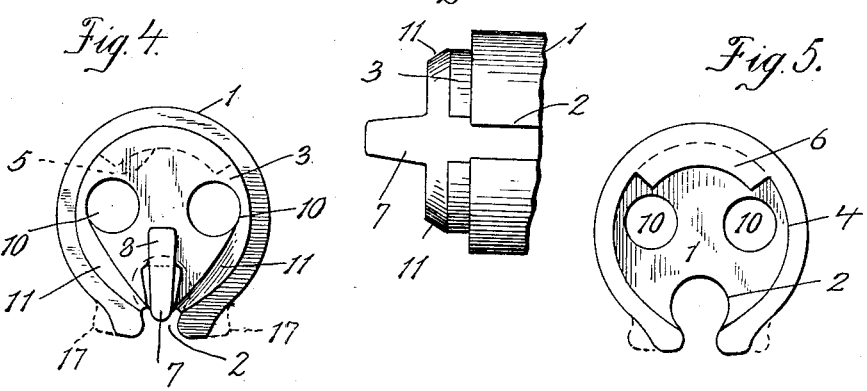
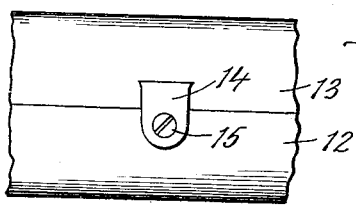
Inventor
ROBERT AMBÜHL
MARX TEITSCH
By their Attorney
Oscar Geier

UNITED STATES PATENT OFFICE.

ROBERT AMBÜHL AND MARX TEITSCH, OF TROY, NEW YORK.

TIRE-FILLER.

1,389,806.      Specification of Letters Patent.      Patented Sept. 6, 1921.

Application filed August 22, 1919, Serial No. 319,075. Renewed March 19, 1921. Serial No. 453,707.

*To all whom it may concern:*

Be it known that we, ROBERT AMBÜHL, a citizen of the United States, residing at Troy, county of Rensselaer, and State of New York, and MARX TEITSCH, a citizen of the United States, residing at Troy, county of Rensselaer, and State of New York, have invented certain new and useful Improvements in Tire-Fillers, of which the following is a specification.

This invention relates to tires for vehicle wheels being intended more particularly for application to automobile or motor truck wheels.

The invention has for an object to provide a non-pneumatic tire which will possess great resiliency and which will permit of damaged parts being replaced without the necessity of renewing the whole tire, thus increasing the life and durability of the tire.

For further comprehension of the invention, and of the objects and advantages thereof, reference will be had to the following description and accompanying drawings, and the appended claims in which the various novel features of the invention are more particularly set forth.

Figure 1 of the drawings is a fragmentary vertical sectional view of a tire having our invention applied thereto, this view being taken on the line 1—1 of Fig. 2.

Fig. 2 is a transverse vertical section on the line 2—2 of Fig. 1.

Fig. 3 is a horizontal section on the line 3—3 of Fig. 2.

Fig. 4 is an end view of one of the tire sections.

Fig. 5 is a similar view showing the opposite end.

Fig. 6 is an inside plan view of the end portion shown in Fig. 4.

Fig. 7 is a fragmentary inside view of the split rim.

Our invention comprises briefly a series of segmental blocks or sections, of a peculiar construction arranged to hold together and to give a high degree of resiliency, and which are adapted either to be contained within and fill an outer tire of the ordinary type now in use, or to be used as a tire without any outer covering.

In the drawings the segmental tire sections are indicated generally by the reference numeral 1. These sections are of approximately circular cross-section with a central longitudinal groove 2 on their inner faces and are linked together at their ends to form a continuous body extending around the wheel.

To join or interlock the sections together the ends thereof are formed with complementary interlocking parts, the sections at one end being each reduced in diameter to provide projecting portions 3 while the adjacent end of the next section is formed with a recess 4 adapted to receive the part.

The portions 3 are formed on their outer faces with segmental recesses or sockets 5, the outer wall of the recess 4 having a complementary rib 6 which fits in the recess 5. Projecting from the end 3 into the groove 2 is a finger 7 having an outturned end 8 forming a hook, this hook engaging in a socket 9 opening into the groove 2. To increase the resiliency of the tire a pair of laterally spaced longitudinal openings 10 are formed in each section, the corresponding openings of the different sections being in alinement, as shown in Fig. 3.

In joining the sections together the rib 6 is first engaged in the segmental socket 5 and then the hook 8 swung into the socket 9, a double hook and socket connection being thus provided at each end as the rib 6 constitutes, in effect, a hook.

The resiliency of the material permits of any slight temporary distortion of the parts during assembling although the end 3 is preferably cut away at the sides as at 11 to permit of its swinging more readily into position in the recess 4.

In connection with our improved tire we preferably employ a rim split longitudinally into two halves 12 and 13 one of which may have a series of projecting lugs such as 14 which project under the other rim half, screws such as 15 holding the parts together.

In Fig. 1 of the drawings we have indicated our device as employed without any outer covering or tire and in Fig. 2 we have shown it employed with an outer covering 16. When employed with an outer covering the flanges on each side of the groove 2 are preferably shaped as shown in full lines in Figs. 4 and 5 and when employed without an outer covering are preferably shaped as indicated at 17 in dotted lines to be engaged by the rim flanges.

Claims:—

1. In a tire, a series of segmental blocks of resilient material placed end to end, such blocks having a pair of hook and socket devices at the ends thereof whereby they are interlocked to one another one of said devices being located adjacent the inner faces of the blocks and the other adjacent the outer faces thereof.

2. In a tire, a series of segmental blocks of resilient material placed end to end, each block having one end reduced in diameter to provide a projecting portion, the opposite end having a complementary recess, the outer face of said projecting end having a segmental socket formed therein, and the wall of the said recess having a complementary rib formed thereon, the said projecting end having on its inner side a longitudinally projecting finger terminating in an outturned hook, the other end having a recess adapted to receive said hook.

3. In a tire, a series of segmental blocks, of resilient material placed end to end and each having a pair of laterally spaced longitudinal openings and a central longitudinal groove on its inner faces, each block having one end reduced in diameter to provide a projecting portion, the opposite end having a complementary recess, the outer face of such projecting end having a segmental socket formed therein, and the wall of the said recess having a complementary rib formed thereon, the said projecting end having on its inner side a finger projecting longitudinally into the said central groove and terminating in an outturned hook, the other end having a recess opening into the said groove and adapted to receive the said hook.

In testimony whereof we have affixed our signatures.

ROBERT AMBÜHL.
MARX TEITSCH.